(12) United States Patent
Suzuki et al.

(10) Patent No.: US 8,180,536 B2
(45) Date of Patent: May 15, 2012

(54) AUTOMATIC TRANSMISSION CONTROL APPARATUS AND METHOD

(75) Inventors: Masami Suzuki, Mishima (JP); Goh Endo, Yokohama (JP)

(73) Assignee: Jatco Ltd, Fuji-shi (JP)

( * ) Notice: Subject to any disclaimer, the term of this patent is extended or adjusted under 35 U.S.C. 154(b) by 307 days.

(21) Appl. No.: 12/481,883

(22) Filed: Jun. 10, 2009

(65) Prior Publication Data

US 2009/0319141 A1 Dec. 24, 2009

(30) Foreign Application Priority Data

Jun. 19, 2008 (JP) ................................. 2008-160705

(51) Int. Cl.
*F16H 61/16* (2006.01)
(52) U.S. Cl. ............... 701/51; 701/36; 701/55; 701/56; 701/58; 701/61; 701/64; 701/67; 701/87; 701/94; 701/95; 701/102; 475/121; 475/125; 475/153; 477/34; 477/46; 477/70; 477/107; 477/128; 477/129; 477/132; 477/166; 477/174; 180/337; 180/338
(58) Field of Classification Search ................ 701/1, 29, 701/36, 51–68, 93–95, 100–112; 477/34–181; 180/337–385
See application file for complete search history.

(56) References Cited

U.S. PATENT DOCUMENTS

| | | | | |
|---|---|---|---|---|
| 5,029,087 A | * | 7/1991 | Cowan et al. | 701/68 |
| 5,369,581 A | * | 11/1994 | Ohsuga et al. | 701/48 |
| 6,059,690 A | * | 5/2000 | Tanizawa et al. | 477/169 |
| 6,068,576 A | * | 5/2000 | Tsutsui et al. | 477/144 |
| 6,616,576 B2 | | 9/2003 | Saito | |
| 6,884,200 B2 | * | 4/2005 | Shimaguchi | 477/124 |
| 2002/0160880 A1 | * | 10/2002 | Sekii et al. | 477/143 |
| 2003/0163235 A1 | * | 8/2003 | Tokura et al. | 701/67 |
| 2005/0101435 A1 | * | 5/2005 | Cowan | 477/83 |
| 2007/0149351 A1 | * | 6/2007 | Inuta | 477/70 |
| 2007/0191184 A1 | * | 8/2007 | Kuwahara et al. | 477/115 |
| 2008/0125267 A1 | | 5/2008 | Dourra et al. | |
| 2008/0300104 A1 | * | 12/2008 | Park et al. | 477/80 |
| 2009/0171543 A1 | * | 7/2009 | Sato et al. | 701/55 |
| 2009/0171544 A1 | * | 7/2009 | Tanaka et al. | 701/55 |

FOREIGN PATENT DOCUMENTS

| | | |
|---|---|---|
| JP | 09-273627 A | 10/1997 |
| JP | 2002-089691 A | 3/2002 |

* cited by examiner

*Primary Examiner* — Jonathan M Dager
(74) *Attorney, Agent, or Firm* — Foley & Lardner LLP

(57) ABSTRACT

During control of a shift of a first friction engagement element from an engaged state into a disengaged state and a shift of a second friction engagement element from a disengaged state into an engaged state for a gear shift to a first target gear from a second target gear, a desired torque capacity of the first friction engagement element is set based on an actual transmission gear ratio by interpolation from values of the desired torque capacity corresponding to at least first and second reference transmission gear ratios, wherein the first reference transmission gear ratio is a transmission gear ratio at start of an inertia phase of the shift control. When the first reference transmission gear ratio is between the actual transmission gear ratio and the second reference transmission gear ratio, the desired torque capacity is set to the value corresponding to the first reference transmission gear ratio.

10 Claims, 6 Drawing Sheets

| | B1 Fr/B | C1 I/C | C2 D/C | C3 H&LR/C | B2 LOW/B | B3 2346/B | B4 R/B | F1 | F2 |
|---|---|---|---|---|---|---|---|---|---|
| 1ST | (○) | | | (○) | ○ | | | ○ | ○ |
| 2ND | | | | (○) | ○ | ○ | | | ○ |
| 3RD | | | ○ | | ○ | ○ | | | |
| 4TH | | | ○ | ○ | | ○ | | | |
| 5TH | | ○ | ○ | ○ | | | | | |
| 6TH | | ○ | | ○ | | ○ | | | |
| 7TH | ○ | ○ | | ○ | | | | ○ | |
| REV | ○ | | | ○ | | | ○ | | |

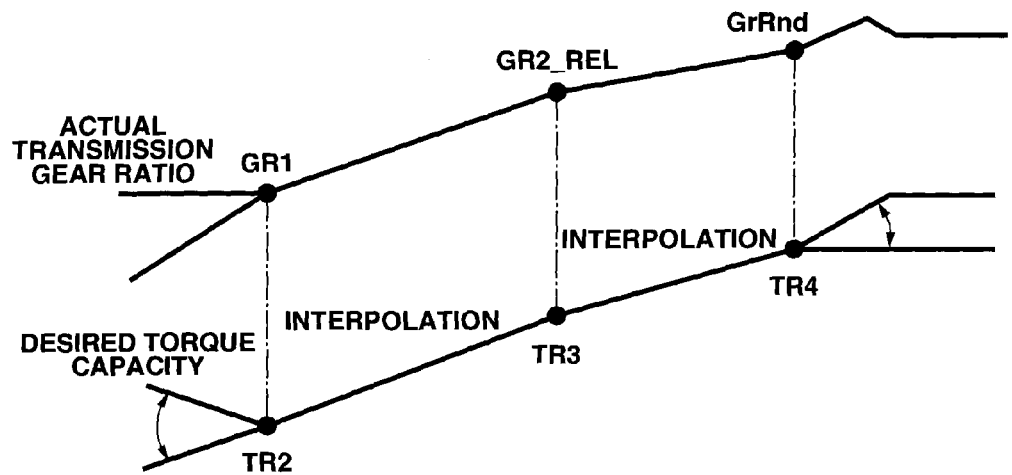
FIG. 6
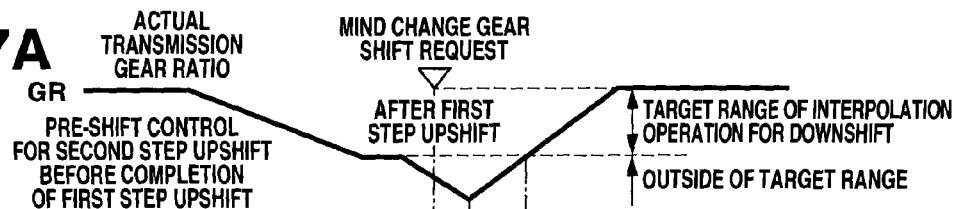
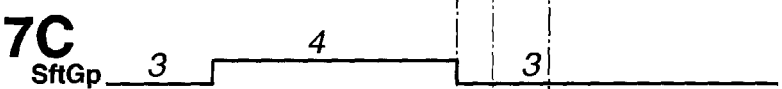
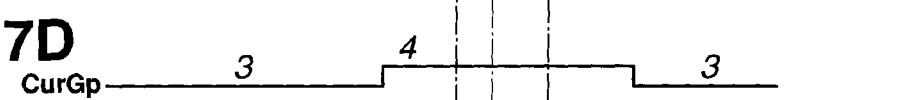
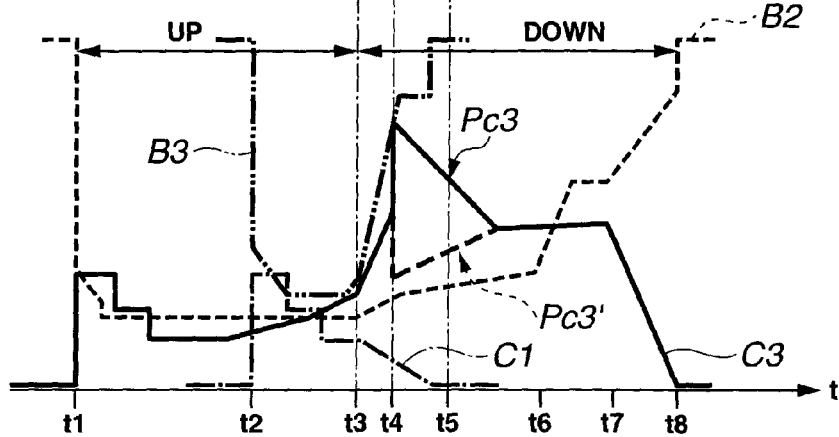

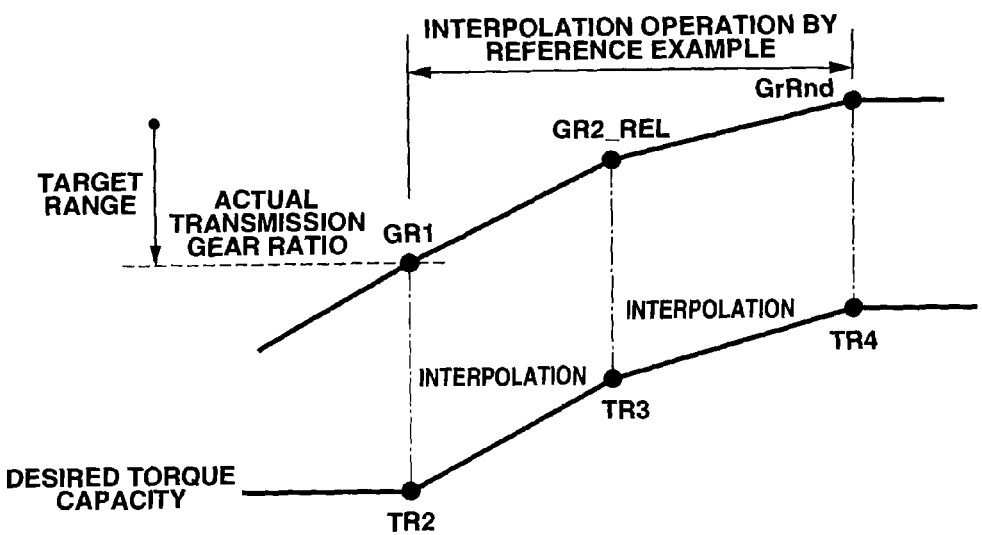
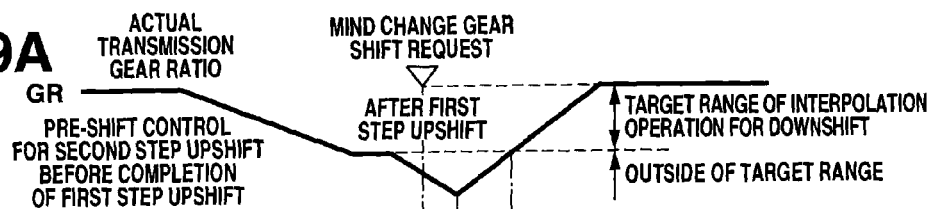
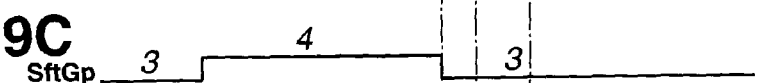
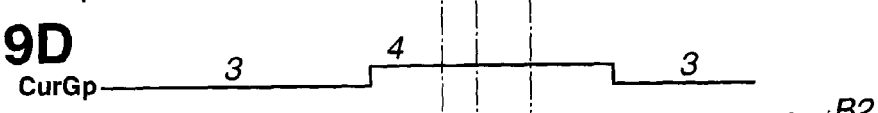
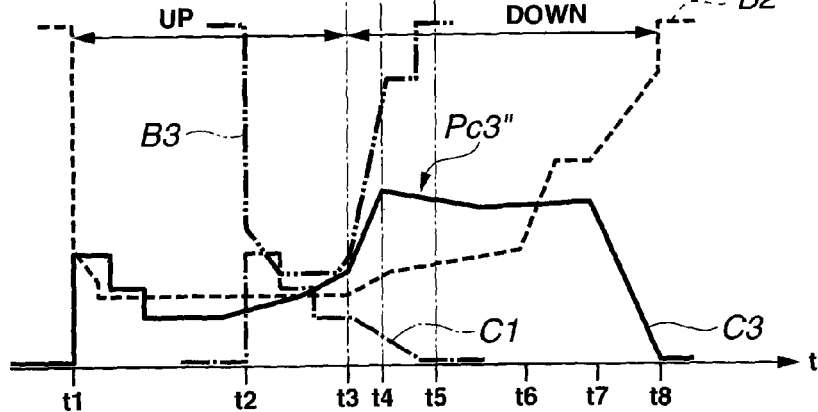

AUTOMATIC TRANSMISSION CONTROL APPARATUS AND METHOD

BACKGROUND OF THE INVENTION

The present invention relates generally to automatic transmissions constructed to be shifted through a gear shift accompanied by a shift of a first friction engagement element from an engaged state into a disengaged state and a shift of a second friction engagement element from a disengaged state into an engaged state, and relates particularly to automatic transmission control apparatuses and methods for controlling a torque capacity of the first or second friction engagement element during an inertia phase of the gear shift.

Japanese Patent Application Publication No. 2002-089691 (henceforth referred to as JP2002-089691) corresponding to U.S. Pat. No. 6,616,576 discloses an automatic transmission control apparatus for an automatic transmission. During an inertia phase of a downshift or upshift of the automatic transmission, the automatic transmission control apparatus calculates a desired torque capacity of a friction engagement element to be engaged or disengaged for the downshift or upshift, on a basis of an actual transmission gear ratio that is calculated on a basis of an input speed and an output speed of the automatic transmission, and controls the friction engagement element by outputting a hydraulic pressure command so as to achieve the desired torque capacity.

Inertia phase or inertia control phase is a phase of a gear shift of an automatic transmission in which an inertial force of a gear train of the automatic transmission plays a major role in changing an input speed of the automatic transmission.

The calculation of the desired torque capacity is implemented by interpolation from values of the desired torque capacity corresponding to a plurality of reference transmission gear ratios. For example, the reference transmission gear ratios include a transmission gear ratio at a starting point of the inertia phase, a transmission gear ratio at an end point of the inertia phase, and a transmission gear ratio at an intermediate point of the inertia phase. Such calculation of a desired torque capacity of a friction engagement element is henceforth referred to as transmission gear ratio interpolation calculation or transmission gear ratio interpolation operation. The transmission gear ratio interpolation operation is performed during the inertia phase from a time instant when the actual transmission gear ratio starts to change in a direction conforming to the downshift or upshift to a time instant when the change of the actual transmission gear ratio in the direction is completed.

SUMMARY OF THE INVENTION

The automatic transmission control apparatus according to JP2002-089691 is to implement transmission gear ratio interpolation operation by interpolation from values of the desired torque capacity at two of the reference transmission gear ratios closer to the actual transmission gear ratio, when the actual transmission gear ratio is outside of a transmission gear ratio interval as a range from the transmission gear ratio at the starting point of the inertia phase to the transmission gear ratio at the end point of the inertia phase. This may cause the desired torque capacity to be set at an unintended value, because no range outside of the transmission gear ratio interval is suitably assumed for transmission gear ratio interpolation. If the desired torque capacity is set at an unintended value, the torque capacity of the friction engagement element may be short or excessive, so as to adversely affect the quality of the gear shift.

The actual transmission gear ratio may fall outside of the transmission gear ratio interval, in situations as described below. It is assumed that a gear shift from a first target gear to a second target gear two steps away from the first target gear is implemented by starting a first step of the gear shift from the first target gear to an intermediate target gear one step away from the first target gear, and starting a second step of the gear shift from the intermediate target gear to the second target gear, before completing the first step. When a request for a gear shift to the first target gear is issued during the gear shift from the first target gear to the intermediate target gear, then the gear shift to the second target gear is aborted, and the gear shift to the first target gear is started. At this moment, the actual transmission gear ratio is close to the value corresponding to the second target gear so that the actual transmission gear ratio starts to change toward the value corresponding to the first target gear from outside of the transmission gear ratio interval between the first and intermediate target gears.

In view of the foregoing, it is desirable to provide an automatic transmission control apparatus and an automatic transmission control method for an automatic transmission, which is capable of achieving a smooth and speedy inertia phase of a gear shift while preventing the torque capacity of an associated friction engagement element from deviating from a desired range, and preventing the load of calculation from increasing.

According to one aspect of the present invention, an automatic transmission control apparatus for an automatic transmission in which a first friction engagement element is in a disengaged state and a second friction engagement element is in an engaged state when in a first target gear, and the first friction engagement element is in an engaged state and the second friction engagement element is in a disengaged state when in a second target gear, comprises: a sensor for obtaining an actual transmission gear ratio of the automatic transmission; and a controller connected to the sensor, and configured to: perform a first shift control of controlling a shift of the first friction engagement element from the engaged state into the disengaged state and a shift of the second friction engagement element from the disengaged state into the engaged state for a first gear shift of the automatic transmission from the second target gear to the first target gear; and perform a process during the first shift control, the process including: a first operation of setting a desired torque capacity of one of the first and second friction engagement elements on a basis of the actual transmission gear ratio by interpolation from values of the desired torque capacity corresponding to at least first and second reference transmission gear ratios, wherein the first reference transmission gear ratio is a transmission gear ratio at start of an inertia phase of the first shift control; and a second operation of setting the desired torque capacity to the value corresponding to the first reference transmission gear ratio, in response to determination that the first reference transmission gear ratio is between the actual transmission gear ratio and the second reference transmission gear ratio.

According to another aspect of the present invention, an automatic transmission control apparatus for an automatic transmission in which a first friction engagement element is in a disengaged state and a second friction engagement element is in an engaged state when in a first target gear, and the first friction engagement element is in an engaged state and the second friction engagement element is in a disengaged state when in a second target gear, comprises: means for obtaining an actual transmission gear ratio of the automatic transmission; means for performing a first shift control of controlling a shift of the first friction engagement element from the engaged state into the disengaged state and a shift of the second friction engagement element from the disengaged state into the engaged state for a first gear shift of the automatic transmission from the second target gear to the first target gear; and means for performing a process during the first shift control, the process including: a first operation of setting a desired torque capacity of one of the first and second friction engagement elements on a basis of the actual transmission gear ratio by interpolation from values of the desired torque capacity corresponding to at least first and second reference transmission gear ratios, wherein the first reference transmission gear ratio is a transmission gear ratio at start of an inertia phase of the first shift control; and a second operation of setting the desired torque capacity to the value corresponding to the first reference transmission gear ratio, in response to determination that the first reference transmission gear ratio is between the actual transmission gear ratio and the second reference transmission gear ratio.

According to a further aspect of the present invention, an automatic transmission control method for an automatic transmission in which a first friction engagement element is in a disengaged state and a second friction engagement element is in an engaged state when in a first target gear, and the first friction engagement element is in an engaged state and the second friction engagement element is in a disengaged state when in a second target gear, comprises: obtaining an actual transmission gear ratio of the automatic transmission; performing a first shift control of controlling a shift of the first friction engagement element from the engaged state into the disengaged state and a shift of the second friction engagement element from the disengaged state into the engaged state for a first gear shift of the automatic transmission from the second target gear to the first target gear; and performing a process during the first shift control, the process including: a first operation of setting a desired torque capacity of one of the first and second friction engagement elements on a basis of the actual transmission gear ratio by interpolation from values of the desired torque capacity corresponding to at least first and second reference transmission gear ratios, wherein the first reference transmission gear ratio is a transmission gear ratio at start of an inertia phase of the first shift control; and a second operation of setting the desired torque capacity to the value corresponding to the first reference transmission gear ratio, in response to determination that the first reference transmission gear ratio is between the actual transmission gear ratio and the second reference transmission gear ratio.

BRIEF DESCRIPTION OF THE DRAWINGS

FIG. 6 is a diagram showing how during a downshift, a desired torque capacity of a friction engagement element to be disengaged is calculated on a basis of an actual transmission gear ratio through a process of transmission gear ratio interpolation operation according to a reference example.

FIGS. 7A to 7E are time charts showing how a gear shift is performed in response to a request for a downshift to third gear during a third to fifth gear shift in the reference example.

FIG. 8 is a diagram showing how during a downshift of the automatic transmission of FIG. 1, a desired torque capacity of a friction engagement element to be disengaged is calculated on a basis of an actual transmission gear ratio through a process of transmission gear ratio interpolation operation according to the embodiment.

FIGS. 9A to 9E are time charts showing how a gear shift is performed in response to a request for a downshift to third gear during a third to fifth gear shift in the embodiment.

DETAILED DESCRIPTION OF THE INVENTION

Figure 1:
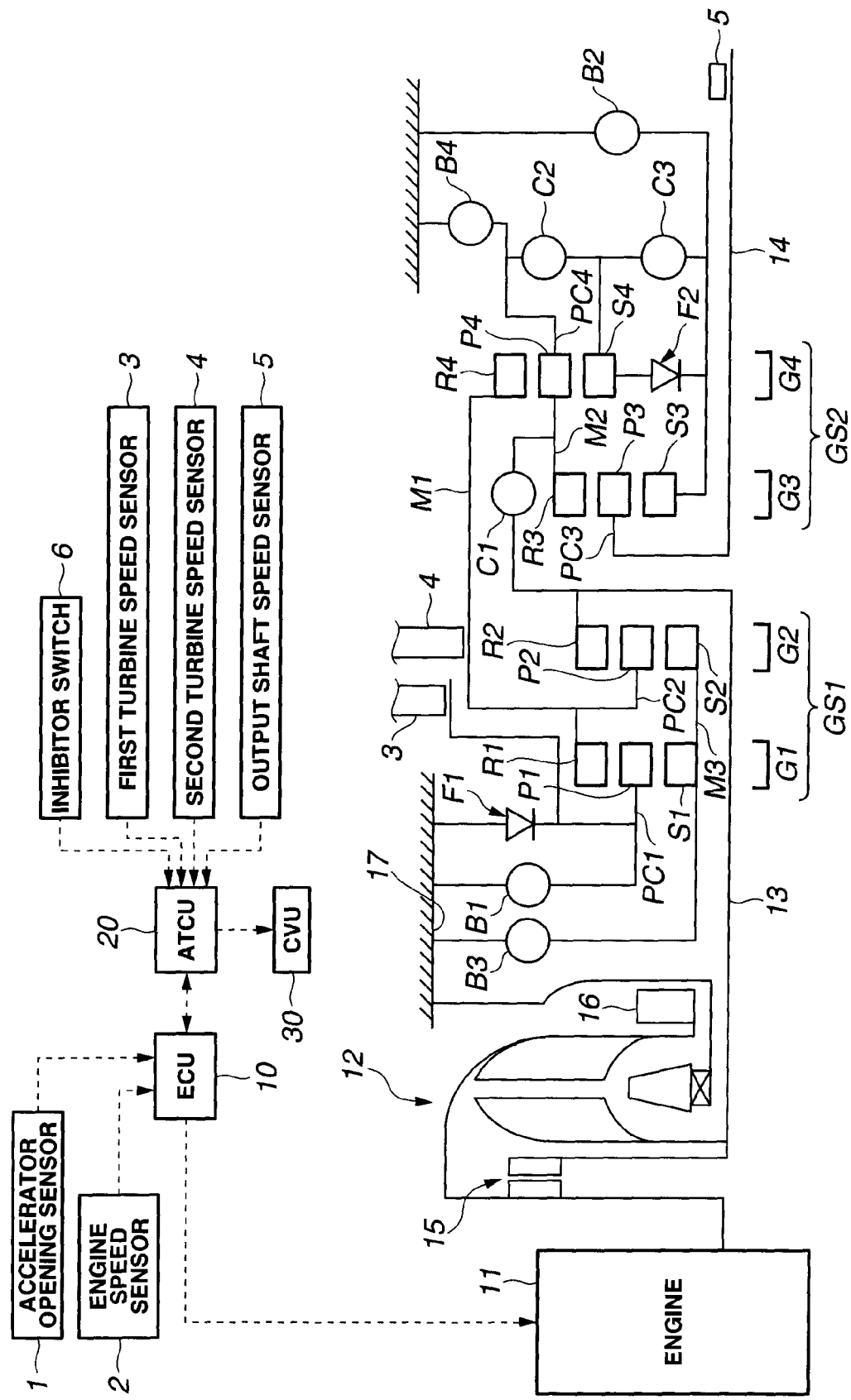
FIG. 1 is a skeleton diagram showing a powertrain system in which an automatic transmission is provided with an automatic transmission control apparatus according to an embodiment of the present invention.

FIG. 1 is a skeleton diagram showing a powertrain system in which an automatic transmission is provided with an automatic transmission control apparatus according to an embodiment of the present invention. The automatic transmission is a seven forward speed and one reverse speed automatic transmission, in this example. In the powertrain system, an engine 11 outputs a driving torque which is transmitted through a torque converter 12 with a lockup clutch 15 to an input shaft 13 of the automatic transmission. The inputted driving torque and inputted rotational speed are shifted by a gear train of the automatic transmission, and then outputted through an output shaft 14. The gear train includes four planetary gears and seven friction engagement elements, as detailed below. The powertrain system is provided with an oil pump 16 which is coaxially arranged with a pump impeller of torque converter 12, and rotated by the driving torque of engine 11 to supply pressurized oil.

The powertrain system includes an engine controller (or engine control unit, ECU) 10 for controlling the driving torque and rotational speed of engine 11, an automatic transmission controller (or automatic transmission control unit, ATCU) 20 for controlling gear shift operations of the automatic transmission, and a control valve unit (CVU) 30 for supplying hydraulic pressures to the friction engagement elements according to control signals from automatic transmission controller 20. Engine controller 10 and automatic transmission controller 20 are connected to each other, for example, through a CAN communication line, and share sensor information and control information.

Engine controller 10 is connected to an accelerator opening sensor 1 for sensing a quantity of operation of an accelerator pedal by an operator (i.e., accelerator opening), and an engine speed sensor 2 for sensing the rotational speed of engine 11. Engine controller 10 is configured to control the output rotational speed and output driving torque of engine 11 by adjusting fuel injection quantity and throttle opening on a basis of engine speed and accelerator opening.

Automatic transmission controller 20 is connected to a first turbine speed sensor 3, a second turbine speed sensor 4, an output shaft speed sensor 5, and an inhibitor switch 6. First turbine speed sensor 3 is arranged to sense the rotational speed of a first planet-pinion carrier PC1. Second turbine speed sensor 4 is arranged to sense the rotational speed of a first ring gear R1. Output shaft speed sensor 5 is arranged to sense the rotational speed of output shaft 14. Inhibitor switch 6 is arranged to sense a range position selected by a shift lever. While the D range is selected, automatic transmission controller 20 selects an optimum one of gears on the basis of vehicle travel speed Vsp and accelerator opening APO, and outputs a corresponding control signal to control valve unit 30 for establishing the selected gear. First turbine speed sensor 3, second turbine speed sensor 4, and output shaft speed sensor 5 serve as a sensor for obtaining an actual transmission gear ratio of the automatic transmission.

The gear train between input shaft 13 and output shaft 14 includes a first planetary gear set GS1 and a second planetary gear set GS2 which are arranged along an axis extending from input shaft 13 to output shaft 14. First planetary gear set GS1 includes a first planetary gear G1 and second planetary gear G2. Second planetary gear set GS2 includes a third planetary gear G3 and a fourth planetary gear G4. Moreover, the gear train includes a first clutch C1, a second clutch C2, a third clutch C3, a first brake B1, a second brake B2, a third brake B3, and a fourth brake B4, as friction engagement elements. The gear train also includes a first one-way clutch F1, and a second one-way clutch F2.

First planetary gear G1 is a single-pinion planetary gear which includes a first sun gear S1, the first ring gear R1, and the first planet-pinion carrier PC1 that carries a first planet pinion P1 engaged with first sun gear S1 and first ring gear R1.

Second planetary gear G2 is a single-pinion planetary gear which includes a second sun gear S2, a second ring gear R2, and a second planet-pinion carrier PC2 that carries a second planet pinion P2 engaged with second sun gear S2 and second ring gear R2.

Third planetary gear G3 is a single-pinion planetary gear which includes a third sun gear S3, a third ring gear R3, and a third planet-pinion carrier PC3 that carries a third planet pinion P3 engaged with third sun gear S3 and third ring gear R3.

Fourth planetary gear G4 is a single-pinion planetary gear which includes a fourth sun gear S4, a fourth ring gear R4, and a fourth planet-pinion carrier PC4 that carries a fourth planet pinion P4 engaged with fourth sun gear S4 and fourth ring gear R4.

Input shaft 13, to which the output driving torque of engine 11 is inputted through torque converter 12, is fixedly coupled to second ring gear R2. On the other hand, output shaft 14 is fixedly coupled to third planet-pinion carrier PC3, and arranged to output a torque through a final gear to driving wheels.

First ring gear R1, second planet-pinion carrier PC2, and fourth ring gear R4 are fixedly coupled to each other by a first coupler M1. Third ring gear R3 and fourth planet-pinion carrier PC4 are fixedly coupled to each other by a second coupler M2. First sun gear S1 and second sun gear S2 are fixedly coupled to each other by a third coupler M3.

First planetary gear set GS1 includes four independent rotating elements, because first planetary gear G1 and second planetary gear G2 are coupled through first coupler M1 and third coupler M3. Second planetary gear set GS2 includes five independent rotating elements, because third planetary gear G3 and fourth planetary gear G4 are coupled to each other through second coupler M2.

First planetary gear set GS1 receives the inputted torque through second ring gear R2 from input shaft 13, and outputs a torque through first coupler M1 to second planetary gear set GS2. Second planetary gear set GS2 receives the inputted torque through second coupler M2 from input shaft 13, and the torque from first planetary gear set GS1 through first coupler M1 and fourth ring gear R4, and outputs a torque through third planet-pinion carrier PC3 to output shaft 14.

First clutch C1, which may be referred to as input clutch, is connected between input shaft 13 and second coupler M2 for fixedly coupling the input shaft 13 to second coupler M2 or disconnecting the input shaft 13 from second coupler M2. Second clutch C2, which may be referred to as direct clutch, is connected between fourth sun gear S4 and fourth planet-pinion carrier PC4 for fixedly coupling the fourth sun gear S4 to fourth planet-pinion carrier PC4 or disconnecting the fourth sun gear S4 from fourth planet-pinion carrier PC4. Third clutch C3, which may be referred to as H&LR clutch, is connected between third sun gear S3 and fourth sun gear S4 for fixedly coupling the third sun gear S3 to fourth sun gear S4 or disconnecting the third sun gear S3 from fourth sun gear S4.

Second one-way clutch F2 is connected between third sun gear S3 and fourth sun gear S4 for allowing the third sun gear S3 and fourth sun gear S4 to rotate independently of each other, when third clutch C3 is disengaged, and fourth sun gear S4 is rotating faster than third sun gear S3. This allows the third planetary gear G3 and fourth planetary gear G4 to have independent gear ratios, because third planetary gear G3 and fourth planetary gear G4 are coupled only through second coupler M2.

First brake B1, which may be referred to as front brake, is connected between first planet-pinion carrier PC1 and a transmission case 17 for holding the first planet-pinion carrier PC1 stationary with respect to transmission case 17 or allowing the first planet-pinion carrier PC1 to rotate with respect to transmission case 17. First one-way clutch F1 is connected between first planet-pinion carrier PC1 and transmission case 17 in parallel to first brake B1. Second brake B2, which may be referred to as low brake, is connected between third sun gear S3 and transmission case 17 for holding the third sun gear S3 stationary with respect to transmission case 17 or allowing the third sun gear S3 to rotate with respect to transmission case 17. Third brake B3, which may be referred to as 2346-brake, is connected between transmission case 17 and third coupler M3 which connects first sun gear S1 to second sun gear S2, for holding the third coupler M3 stationary with respect to transmission case 17 or allowing the third coupler M3 to rotate with respect to transmission case 17. Fourth brake B4, which may be referred to as reverse brake, is connected between third planet-pinion carrier PC3 and transmission case 17 for holding the third planet-pinion carrier PC3 stationary with respect to transmission case 17 or allowing the third planet-pinion carrier PC3 to rotate with respect to transmission case 17.

Figures 2, 3:
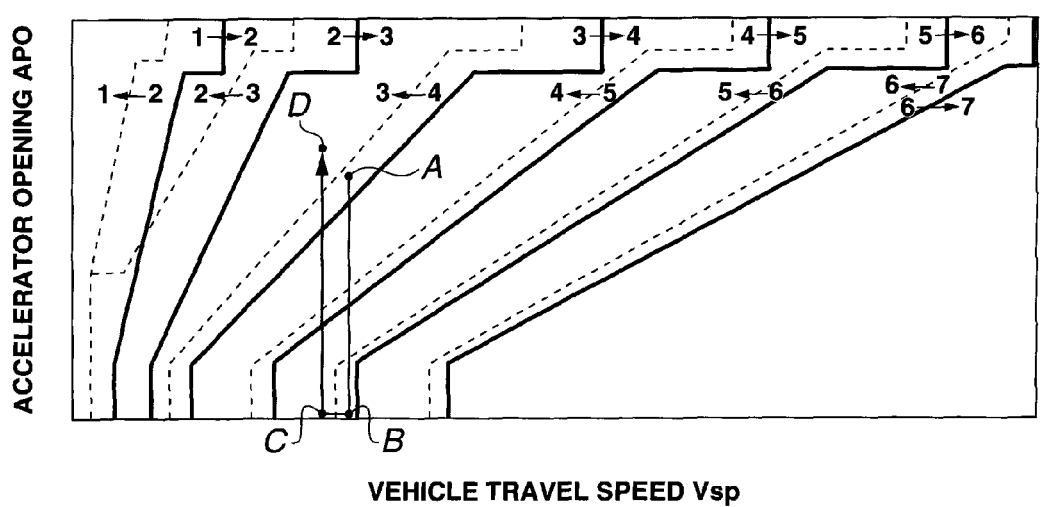
FIG. 2 is a table showing operating states of friction engagement elements in individual speed gears in the automatic transmission of FIG. 1.
FIG. 3 is a shift diagram showing an example of a shift map used for a gear shift control of the automatic transmission of FIG. 1 in a drive range (D range).

FIG. 2 is a table showing operating states of friction engagement elements in individual speed gears in the automatic transmission of FIG. 1. In the table of FIG. 2, each open circle represents a condition in which a corresponding friction engagement element is in an engaged state, and each blank cell represents a condition in which a corresponding friction engagement element is in a disengaged state. Each bracketed open circle represents a condition in which a corresponding friction engagement element is in an engaged state when a range is selected in which engine braking is active.

As shown in FIG. 2, each upshift or downshift between two adjacent gears is implemented by a shift of one of the friction engagement elements from an engaged state to a disengaged state, and a shift of another of the friction engagement elements from a disengaged state to an engaged state. In this way, the automatic transmission achieves seven forward transmission gear ratios, and one reverse transmission gear ratio.

Specifically, in first gear, second brake B2 is in the engaged state, and accordingly, first one-way clutch F1 and second one-way clutch F2 are in their engaged states. In second gear, second brake B2 and third brake B3 are in their engaged states, and accordingly, second one-way clutch F2 is in the engaged state. In third gear, second brake B2, third brake B3 and second clutch C2 are in their engaged states, and accordingly, first one-way clutch F1 and second one-way clutch F2 are in the disengaged state. In fourth gear, third brake B3, second clutch C2 and third clutch C3 are in their engaged states. In fifth gear, first clutch C1, second clutch C2 and third clutch C3 are in their engaged states. In sixth gear, third brake B3, first clutch C1 and third clutch C3 are in their engaged states. In seventh gear, first brake B1, first clutch C1 and third clutch C3 are in their engaged states. In reverse gear, fourth brake B4, first brake B1 and third clutch C3 are in their engaged states.

FIG. 3 is a shift diagram showing an example of a shift map used for a gear shift control of the automatic transmission of FIG. 1 in a drive range (D range). In FIG. 3, solid lines represent upshift lines, and broken lines represent downshift lines. Each point in the shift map represents an operating point which is defined by vehicle travel speed Vsp and accelerator opening APO. In the D range, automatic transmission controller 20 determines a current operating point in the shift map of FIG. 3 on the basis of measured vehicle travel speed Vsp from output shaft speed sensor 5 as a vehicle speed sensor, and measured accelerator opening APO from accelerator opening sensor 1. While the operating point is stationary or moving within a single one of regions of the shift map, automatic transmission controller 20 maintains the current gear or current transmission gear ratio. When the operating point moves across an upshift line, automatic transmission controller 20 issues a control signal indicative of an upshift from one gear corresponding to the preceding region to another gear corresponding to the subsequent region. On the other hand, when the operating point moves across a downshift line, automatic transmission controller 20 issues a control signal indicative of a downshift from one gear corresponding to the preceding region to another gear corresponding to the subsequent region.

Figure 4:
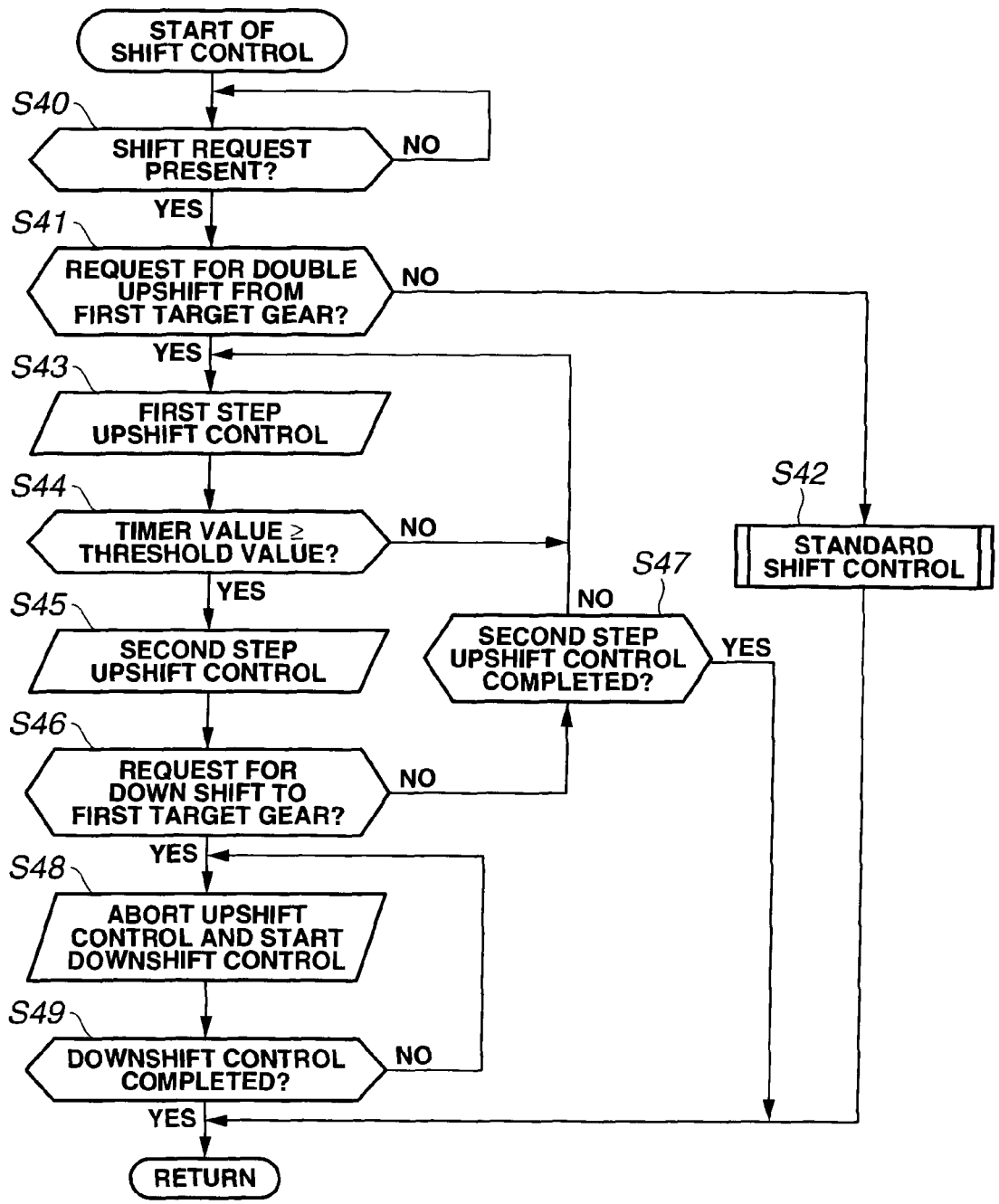
FIG. 4 is a flow chart showing a process of the gear shift control which is performed by an automatic transmission controller of the powertrain system of FIG. 1 in response to a request for a double step upshift in the D range.

FIG. 4 is a flow chart showing a process of the gear shift control which is performed by automatic transmission controller 20 in response to a request for a double step upshift in the D range. During this process, automatic transmission controller 20 repeatedly checks whether or not a shift request or shift command, such as an upshift request or a downshift request, is issued.

At Step S40, automatic transmission controller 20 determines whether or not a shift request is present. When the answer to Step S40 is affirmative (YES), i.e. when it is determined at Step S40 that a shift request is present, then automatic transmission controller 20 proceeds to Step S41. On the other hand, when the answer to Step S40 is negative (NO), i.e. when it is determined at Step S40 that no shift request is present, then automatic transmission controller 20 repeats the operation of Step S40.

At Step S41, in response to determination at Step S40 that a shift request is present, automatic transmission controller 20 determines whether or not the shift request is a double upshift request for an upshift from a first target gear through a second target gear to a third target gear two steps higher than the first target gear. When the answer to Step S41 is YES, i.e. when it is determined at Step S41 that the shift request is a double upshift request, then automatic transmission controller 20 proceeds to Step S43. On the other hand, when the answer to Step S41 is NO, i.e. when it is determined at Step S41 that the shift request is not a double upshift request, then automatic transmission controller 20 proceeds to Step S42.

At Step S42, in response to determination at Step S41 that the shift request is not a double upshift request, automatic transmission controller 20 performs a standard shift control for an upshift or downshift between two adjacent gears, and then returns from this control process.

At Step S43, in response to determination at Step S41 that the shift request is a double upshift request, or in response to determination at Step S44 that a timer value is smaller than a threshold value, or in response to determination at Step S47 that the double upshift is not completed, automatic transmission controller 20 performs an upshift control for a shift from the first target gear to the second target gear as a first step of the overall upshift, and then proceeds to Step S44. For example, in cases where the shift request is a double upshift request for an upshift from third gear to fifth gear, automatic transmission controller 20 performs an upshift control at Step S43 for an upshift from third gear to fourth gear as a first step by shifting the third clutch C3 from the disengaged state to the engaged state and shifting the second brake B2 from the engaged state to the disengaged state.

At Step S44, after start of the upshift control for the first step at Step S43, automatic transmission controller 20 determines whether or not a timer value (elapsed time) is greater than or equal to a predetermined threshold value, where the timer value is of a timer which is started when the double upshift request is issued. When the answer to Step S44 is YES, i.e. when it is determined at Step S44 that the timer value is greater than or equal to the threshold value, then automatic transmission controller 20 proceeds to Step S45. On the other hand, when the answer to Step S44 is NO, i.e. when it is determined at Step S44 that the timer value is smaller than the threshold value, then automatic transmission controller 20 returns to Step S43. The threshold value is predetermined to a time period required for a process in which the upshift from the first target gear to the second target gear reaches a predetermined stage of an inertia phase of the upshift (an intermediate point between a starting point of the inertia phase and an end point of the inertia phase).

At Step S45, in response to determination at Step S44 that the timer value is greater than or equal to the threshold value, automatic transmission controller 20 performs an upshift control for an upshift from the second target gear to the third target gear as a second step of the overall upshift, and then proceeds to Step S46. For example, in cases where the shift request is a double upshift request for an upshift from third gear to fifth gear, automatic transmission controller 20 performs an upshift control at Step S45 for an upshift from fourth gear to fifth gear as a second step by shifting the first clutch C1 from the disengaged state to the engaged state and shifting the third brake B3 from the engaged state to the disengaged state.

At Step S46, after start of the upshift control for the second step at Step S45, automatic transmission controller 20 determines whether or not a downshift request to the first target gear is present. When the answer to Step S46 is YES, i.e. when it is determined at Step S46 that a downshift request to the first target gear is present, then automatic transmission controller 20 proceeds to Step S48. On the other hand, when the answer to Step S46 is NO, i.e. when it is determined at Step S46 that no downshift request to the first target gear is present, then automatic transmission controller 20 proceeds to Step S47. The downshift request is referred to as mind change gear shift request.

At Step S47, in response to determination at Step S46 that no downshift request to the first target gear is present, automatic transmission controller 20 determines whether or not the double upshift control is completed. When the answer to Step S47 is YES, i.e. when it is determined at Step S47 that the double upshift control is completed, then automatic transmission controller 20 returns from this control process. On the other hand, when the answer to Step S47 is NO, i.e. when it is determined at Step S47 that the double upshift control is not completed, then automatic transmission controller 20 returns to Step S43.

At Step S48, in response to determination at Step S46 that a downshift request to the first target gear is present, or in response to determination at Step S49 that the downshift control is not completed, automatic transmission controller 20 aborts or cancels the upshift control for the first step and the upshift control for the second step, and performs a downshift to the first target gear, and then proceeds to Step S49. For example, in cases where the shift request is a double upshift request for an upshift from third gear to fifth gear, automatic transmission controller 20 aborts the upshift control for the first step by aborting engagement of third clutch C3 and disengagement of second brake B2, and aborts the upshift control for the second step by aborting engagement of first clutch C1 and disengagement of third brake B3. Then, automatic transmission controller 20 implements the downshift control for the downshift to third gear as the first target gear by disengaging control of first clutch C1, engaging control of third brake B3, disengaging control of third clutch C3, and engaging control of second brake B2.

At Step S49, after start of the downshift control to the first target gear, automatic transmission controller 20 determines whether or not the downshift control to the first target gear is completed. When the answer to Step S49 is YES, i.e. when it is determined at Step S49 that the downshift control to the first target gear is completed, then automatic transmission controller 20 resets the timer value, and returns from this control process. On the other hand, when the answer to Step S49 is NO, i.e. when it is determined at Step S49 that the downshift control to the first target gear is not completed, then automatic transmission controller 20 returns to Step S48.

Figure 5:
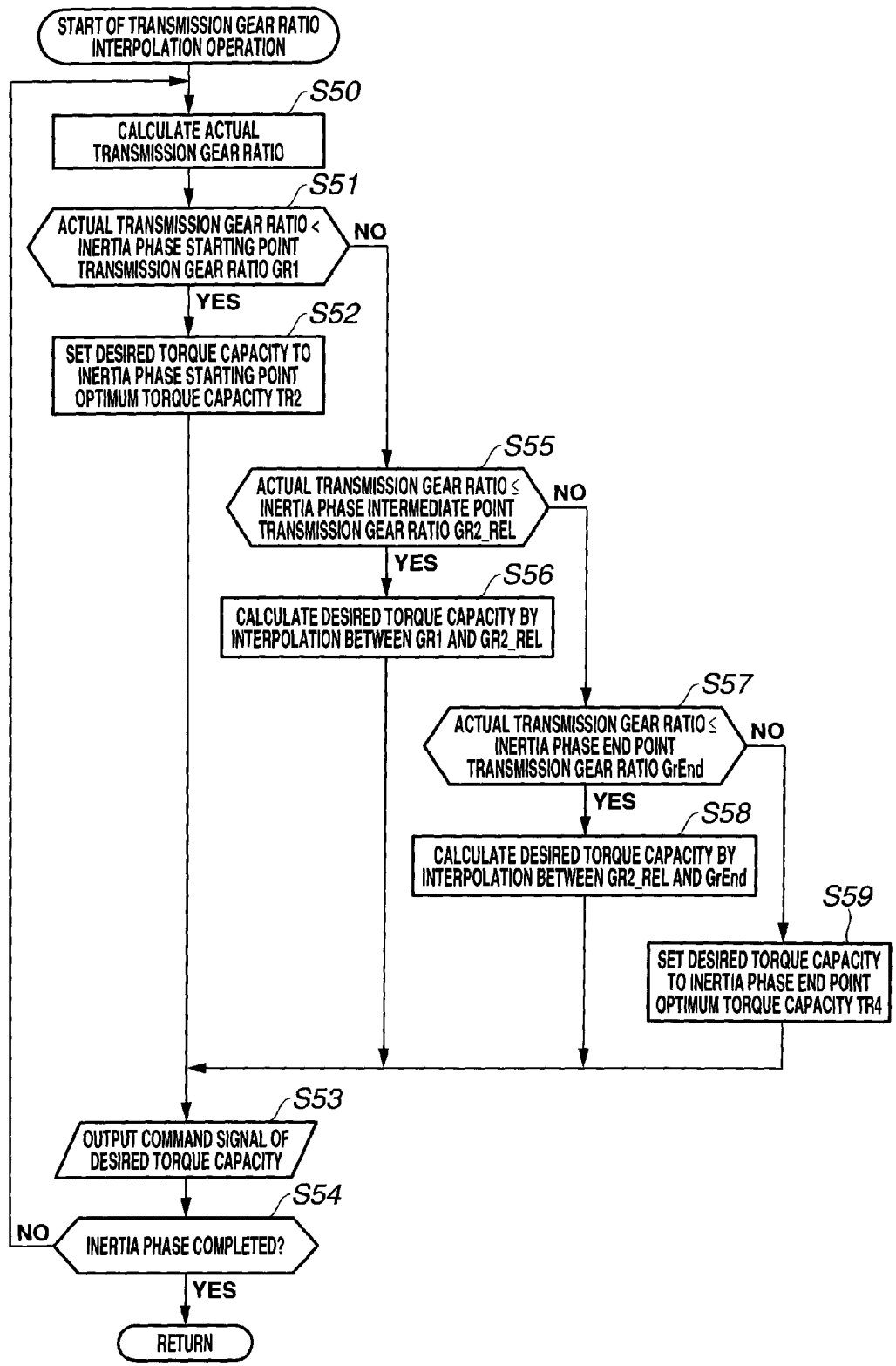
FIG. 5 is a flow chart showing a process of transmission gear ratio interpolation operation which is performed by the automatic transmission controller of the powertrain system of FIG. 1.

FIG. 5 is a flow chart showing a process of transmission gear ratio interpolation operation which is performed by automatic transmission controller 20. The process of transmission gear ratio interpolation operation is applied to control of the hydraulic pressure of a friction engagement element to be disengaged during a power-on downshift (accelerator-depressed downshift). The process is started when the actual transmission gear ratio starts to change in a direction of downshift, or increase, in response to the progress of the downshift. The interpolation according to the embodiment is implemented by liner interpolation, for example.

At Step S50, automatic transmission controller 20 calculates an actual transmission gear ratio of the automatic transmission on the basis of a transmission input speed and a transmission output speed, where the transmission input speed is obtained with reference to information from first turbine speed sensor 3 and second turbine speed sensor 4, and the transmission output speed is obtained with reference to information from output shaft speed sensor 5. Then, automatic transmission controller 20 proceeds to Step S51.

At Step S51, after calculation of the actual transmission gear ratio, automatic transmission controller 20 determines whether or not the actual transmission gear ratio is lower than an inertia phase starting point transmission gear ratio GR1 as a transmission gear ratio at a starting point of the inertia phase of the downshift, i.e. whether or not the actual transmission gear ratio is on the upshift side of the inertia phase starting point transmission gear ratio GR1 and outside of a transmission gear ratio interval as a range from the inertia phase starting point transmission gear ratio GR1 to an inertia phase end point transmission gear ratio GrEnd as a transmission gear ratio at an end point of the inertia phase. In other words, it is determined whether or not the inertia phase starting point transmission gear ratio GR1 is between the actual transmission gear ratio and the inertia phase end point transmission gear ratio GrEnd. When the answer to Step S51 is YES, i.e. when it is determined at Step S51 that the actual transmission gear ratio is lower than the inertia phase starting point transmission gear ratio GR1, then automatic transmission controller 20 proceeds to Step S52. On the other hand, when the answer to Step S51 is NO, i.e. when it is determined at Step S51 that the actual transmission gear ratio is higher than or equal to the inertia phase starting point transmission gear ratio GR1, then automatic transmission controller 20 proceeds to Step S55.

At Step S52, in response to determination at Step S51 that the actual transmission gear ratio is lower than the inertia phase starting point transmission gear ratio GR1, automatic transmission controller 20 inhibits interpolation calculation of a desired torque capacity of the friction engagement element, and sets the desired torque capacity to an inertia phase starting point optimum torque capacity TR2 as a desired torque capacity of the friction engagement element at the inertia phase starting point transmission gear ratio GR1. Then, automatic transmission controller 20 proceeds to Step S53.

At Step S53, after the setting of the desired torque capacity at Step S52, S56, S58 or S59, automatic transmission controller 20 outputs a command signal indicative of the desired torque capacity to a disengaging pressure regulation actuator of control valve unit 30 for the friction engagement element to be disengaged. Then, automatic transmission controller 20 proceeds to Step S54.

At Step 554, after the output of the command signal indicative of the desired torque capacity, automatic transmission controller 20 determines whether or not the inertia phase is completed. When the answer to Step S54 is YES, i.e. when it is determined at Step S54 that the inertia phase is completed, then automatic transmission controller 20 terminates the process of transmission gear ratio interpolation operation. On the other hand, when the answer to Step S54 is NO, i.e. when it is determined at Step S54 that the inertia phase is not completed, then automatic transmission controller 20 returns to Step S50. The determination at Step S54 is implemented by monitoring changes of the actual transmission gear ratio, and determining whether or not the actual transmission gear ratio has reached a value corresponding to the end point target gear after downshifting, and fluctuations of the actual transmission gear ratio have converged.

At Step S55, in response to determination at Step S51 that actual transmission gear ratio is higher than or equal to the inertia phase starting point transmission gear ratio GR1, automatic transmission controller 20 determines whether or not the actual transmission gear ratio is lower than or equal to an inertia phase intermediate point transmission gear ratio GR2_REL as a transmission gear ratio at an intermediate point of the inertia phase. When the answer to Step S55 is YES, i.e. when it is determined at Step S55 that the actual transmission gear ratio is lower than or equal to the inertia phase intermediate point transmission gear ratio GR2_REL, then automatic transmission controller 20 proceeds to Step S56. On the other hand, when the answer to Step S55 is NO, i.e. when it is determined at Step S55 that the actual transmission gear ratio is higher than the inertia phase intermediate point transmission gear ratio GR2_REL, then automatic transmission controller 20 proceeds to Step S57.

At Step S56, in response to determination at Step S55 that the actual transmission gear ratio is lower than or equal to the inertia phase intermediate point transmission gear ratio GR2_REL, automatic transmission controller 20 calculates the desired torque capacity by interpolation from the inertia phase starting point optimum torque capacity TR2 at the inertia phase starting point transmission gear ratio GR1 and an inertia phase intermediate point optimum torque capacity TR3 as a desired torque capacity of the friction engagement element at the inertia phase intermediate point transmission gear ratio GR2_REL. Then, automatic transmission controller 20 proceeds to Step S53.

At Step S57, in response to determination at Step S55 that the actual transmission gear ratio is higher than the inertia phase intermediate point transmission gear ratio GR2_REL, automatic transmission controller 20 determines whether or not the actual transmission gear ratio is lower than or equal to the inertia phase end point transmission gear ratio GrEnd. When the answer to Step S57 is YES, i.e. when it is determined at Step S57 that the actual transmission gear ratio is lower than or equal to the inertia phase end point transmission gear ratio GrEnd, then automatic transmission controller 20 proceeds to Step S58. On the other hand, when the answer to Step S57 is NO, i.e. when it is determined at Step S57 that the actual transmission gear ratio is higher than the inertia phase end point transmission gear ratio GrEnd, then automatic transmission controller 20 proceeds to Step S59.

At Step S58, in response to determination at Step S57 that the actual transmission gear ratio is lower than or equal to the inertia phase end point transmission gear ratio GrEnd, automatic transmission controller 20 calculates the desired torque capacity by interpolation calculation from the inertia phase intermediate point optimum torque capacity TR3 at the inertia phase intermediate point transmission gear ratio GR2_REL and an inertia phase end point optimum torque capacity TR4 as a desired torque capacity of the friction engagement element at the inertia phase end point transmission gear ratio GrEnd. Then, automatic transmission controller 20 proceeds to Step S53.

At Step S59, in response to determination at Step S57 that the actual transmission gear ratio is higher than the inertia phase end point transmission gear ratio GrEnd, automatic transmission controller 20 inhibits interpolation calculation of the desired torque capacity, and sets the desired torque capacity to the inertia phase end point optimum torque capacity TR4 at the inertia phase end point transmission gear ratio GrEnd. Then, automatic transmission controller 20 proceeds to Step S53.

The following describes how the automatic transmission control apparatus according to the embodiment produces advantageous effects.

<Problems to Be Solved with Transmission Gear Ratio Interpolation Operation> FIG. 6 is a diagram showing how during a downshift, a desired torque capacity of a friction engagement element to be disengaged is calculated on a basis of an actual transmission gear ratio through a process of transmission gear ratio interpolation operation according to a reference example. FIGS. 7A to 7E are time charts showing how a gear shift is performed in response to a request for a downshift to third gear during a third to fifth gear shift in the reference example, where FIGS. 7A to 7E show the actual transmission gear ration GR, a final target gear NxtGp, an intermediate target gear SftGp, a current gear CurGp, and hydraulic pressures of the friction engagement element, respectively.

In the reference example, for transmission gear ratio interpolation operation for a friction engagement element to be disengaged during a downshift, the inertia phase starting point optimum torque capacity TR2 at the inertia phase starting point transmission gear ratio GR1, the inertia phase intermediate point optimum torque capacity TR3 at the inertia phase intermediate point transmission gear ratio GR2_REL, and the inertia phase end point optimum torque capacity TR4 at the inertia phase end point transmission gear ratio GrEnd are predetermined, as shown in FIG. 6. Two of the optimum torque capacities at the reference transmission gear ratios Gr1, Gr2_REL and GrEnd are selected and used to calculate a desired torque capacity of the friction engagement element at a given actual transmission gear ratio by interpolation calculation.

When the actual transmission gear ratio is in a range lower than inertia phase starting point transmission gear ratio GR1 or in a range between the inertia phase starting point transmission gear ratio GR1 and the inertia phase intermediate point transmission gear ratio GR2_REL, the desired torque capacity is calculated by interpolation from the inertia phase starting point optimum torque capacity TR2 and the inertia phase intermediate point optimum torque capacity TR3. When the actual transmission gear ratio is in a range between the inertia phase intermediate point transmission gear ratio GR2_REL and the inertia phase end point transmission gear ratio GrEnd or in a range higher than the inertia phase end point transmission gear ratio GrEnd, the desired torque capacity is calculated by interpolation from the inertia phase intermediate point optimum torque capacity TR3 and inertia phase end point optimum torque capacity TR4.

The inertia phase starting point optimum torque capacity TR2, the inertia phase intermediate point optimum torque capacity TR3, and the inertia phase end point optimum torque capacity TR4 are determined so as to optimize the speed of initiation of the inertia phase of the downshift and progress of a part of the downshift to the inertia phase intermediate point transmission gear ratio GR2_REL for the range from the inertia phase starting point transmission gear ratio GR1 to the inertia phase intermediate point transmission gear ratio GR2_REL, and optimize the speed of progress of a part of the downshift to the inertia phase end point transmission gear ratio GrEnd for the range from the inertia phase intermediate point transmission gear ratio GR2_REL to the inertia phase end point transmission gear ratio GrEnd.

When the actual transmission gear ratio is in the range lower than inertia phase starting point transmission gear ratio GR1, the desired torque capacity depends on the inertia phase starting point optimum torque capacity TR2 and the inertia phase intermediate point optimum torque capacity TR3. When the inertia phase starting point optimum torque capacity TR2 is greater than the inertia phase intermediate point optimum torque capacity TR3, the desired torque capacity is set higher than the inertia phase starting point optimum torque capacity TR2, and set to increase as the actual transmission gear ratio deviates from the inertia phase starting point transmission gear ratio GR1. When the inertia phase starting point optimum torque capacity TR2 is smaller than the inertia phase intermediate point optimum torque capacity TR3, the desired torque capacity is set smaller than the inertia phase starting point optimum torque capacity TR2, and set to decrease as the actual transmission gear ratio deviates from the inertia phase starting point transmission gear ratio GR1. Similarly, when the actual transmission gear ratio is higher than the inertia phase end point transmission gear ratio GrEnd, the desired torque capacity is calculated with reference to the inertia phase intermediate point optimum torque capacity TR3 and the inertia phase end point optimum torque capacity TR4, depending on whether the inertia phase end point optimum torque capacity TR4 is higher than the inertia phase intermediate point optimum torque capacity TR3.

According to the transmission gear ratio interpolation operation described above, when the actual transmission gear ratio is outside of the transmission gear ratio interval from the inertia phase starting point transmission gear ratio GR1 to the inertia phase end point transmission gear ratio GrEnd, it is possible that the desired torque capacity is set at an unintended value, because no range outside of the transmission gear ratio interval is suitably assumed for transmission gear ratio interpolation. If the desired torque capacity is set at an unintended value, the torque capacity of the friction engagement element may be short or excessive, so as to adversely affect the quality of the gear shift.

The actual transmission gear ratio may fall outside of the transmission gear ratio interval, in situations as shown in FIGS. 7A to 7E. It is assumed that a gear shift from third gear as a first target gear to fifth gear as a second target gear two steps away from the first target gear is implemented in response to release of the accelerator pedal by starting a first step of the gear shift from third gear to fourth gear as an intermediate target gear one step away from the first target gear, and starting a second step of the gear shift from fourth gear to fifth gear, before completing the first step. When a request for a gear shift to third gear is issued in response to depression of the accelerator pedal during the gear shift from third gear to fourth gear, then the gear shift to fifth gear is aborted, and the gear shift to third gear is started. At this moment, the actual transmission gear ratio is close to the value corresponding to fifth gear so that the actual transmission gear ratio starts to change toward the value corresponding to third gear from outside of the transmission gear ratio interval between third and fourth gears.

If the desired torque capacity is calculated to be larger than the inertia phase starting point optimum torque capacity TR2 at the inertia phase starting point transmission gear ratio GR1 by interpolation for the actual transmission gear ratio outside of the transmission gear ratio interval, then the hydraulic pressure of third clutch C3 which is a friction engagement element to be disengaged in the fourth to third gear shift is relatively high at a time instant t4 when the transmission gear ratio interpolation operation is started, and then decreases, as indicated by a curve Pc3 in FIG. 7E. In such cases, third clutch C3 in a slippery engaged state serves as a relatively high resistance against increase of the rotational speed of engine 11. This suppresses the acceleration of engine 11, reduces the speed of progress of the inertia phase, and thereby may result in a slow gear shift.

On the other hand, if the desired torque capacity is calculated to be smaller than the inertia phase starting point optimum torque capacity TR2 at the inertia phase starting point transmission gear ratio GR1 by interpolation for the actual transmission gear ratio outside of the transmission gear ratio interval, then the hydraulic pressure of third clutch C3 which is a friction engagement element to be disengaged in the fourth to third gear shift is relatively low at the time instant t4 when the transmission gear ratio interpolation operation is started, and then increases, as indicated by a curve Pc3' in FIG. 7E. In such cases, third clutch C3 in a slippery engaged state serves to promote increase of the rotational speed of engine 11. This enhances the acceleration of engine 11, increases the speed of progress of the inertia phase, and thereby may cause a shift shock.

<Shift Control> Suppose a situation as shown in FIG. 3 where the operating point moves from point A to point B in response to release of the accelerator pedal so that a request for an upshift from third gear to fifth gear is issued, and the operating point moves from point C to point D in response to depression of the accelerator pedal before the upshift is completed, so that a request for a downshift to third gear is issued. The following describes with reference to the flow chart of FIG. 4 how the automatic transmission control apparatus according to the embodiment performs shift control in such a situation.

When the request for the upshift from third gear as the first target gear to fifth gear as the third target gear is issued in response to releasing operation of the accelerator pedal, automatic transmission controller 20 proceeds in the flow chart of FIG. 4 through Steps S40 and S41 to Step S42 at which automatic transmission controller 20 starts a shift control for the upshift from third gear to fourth gear as the second target gear by engagement of third clutch C3 and disengagement of second brake B2. Until the timer value, which starts to be incremented at the moment when the request for the upshift from third gear to fifth gear is issued, exceeds the threshold value, the operations of Steps S43 and S44 are repeated so that the shift control for the upshift from third gear to fourth gear is continued.

When the timer value exceeds the threshold value during the shift control for the upshift from third gear to fourth gear, automatic transmission controller 20 proceeds from Step S44 to Step S45 at which automatic transmission controller 20 starts a pre-shift control for a shift to fifth gear by engagement of first clutch C1 and disengagement of third brake B3. Until the request for the downshift to third gear is issued, the operations of Step S43, S44, S45, S46 and S47 are repeated so that the shift control for the upshift from third gear to fourth gear and the pre-shift control for the upshift to fifth gear are performed simultaneously with each other. The shift control for the upshift from third gear to fourth gear and the shift control for the upshift from fourth gear to fifth gear are thus overlapped with each other.

When the request for the downshift to third gear as a mind change gear shift request is issued before determination at Step S47 that the shift control for the upshift to fifth gear is completed, automatic transmission controller 20 proceeds in the flow chart of FIG. 4 from Step S46 to Step S48 in response to the mind change gear shift request. At Step S48, automatic transmission controller 20 aborts the pre-shift control by starting to disengage first clutch C1 and engage third brake B3, aborts the shift control for the upshift from third gear to fourth gear, and starts a shift control for a downshift to third gear by disengagement of third clutch C3 and engagement of second brake B2. Until it is determined at Step S49 that the shift control for the downshift is completed, the operations of Steps S48 and S49 are repeated.

When the actual transmission gear ratio starts to change in the downshift direction toward third gear in response to the mind change gear shift request, the transmission gear ratio interpolation operation according to the embodiment is performed for third clutch C3 as a friction engagement element to be disengaged in the fourth to third gear downshift.

In response to determination at Step S49 that the shift control for the downshift is completed, automatic transmission controller 20 returns from Step S49, so that a new control process is started at Step S40. When it is determined at Step S47 that the upshift to fifth gear is completed with no mind change gear shift request issued, automatic transmission controller 20 returns from Step S47, so that a new control process is started at Step S40.

During the process described above, the actual transmission gear ratio is outside of the transmission gear ratio interval between third gear and fourth gear at the issuance of the mind change gear shift request for the downshift to third gear, because the actual transmission gear ratio has been changed beyond the value corresponding to fourth gear toward the value corresponding to fifth gear at the moment by the pre-shift control which accompanies the shift control for the upshift from third gear to fifth gear.

<Transmission Gear Ratio Interpolation Operation> FIG. 8 is a diagram showing how during a downshift of the automatic transmission of FIG. 1, a desired torque capacity of a friction engagement element to be disengaged is calculated on a basis of an actual transmission gear ratio through a process of transmission gear ratio interpolation operation according to the embodiment. The following describes transmission gear ratio interpolation operation which is applied to control of a friction engagement element to be disengaged in a power-on downshift in the drive range, and is started when the actual transmission gear ratio starts to change in the downshift direction.

After start of transmission gear ratio interpolation operation, automatic transmission controller 20 proceeds in the flow chart of FIG. 5 from Step S50 to Step S51 at which automatic transmission controller 20 determines whether or not the actual transmission gear ratio is lower than the inertia phase starting point transmission gear ratio GR1. If the actual transmission gear ratio is lower than the inertia phase starting point transmission gear ratio GR1, automatic transmission controller 20 proceeds from Step S51 to Step S52 at which automatic transmission controller 20 inhibits transmission gear ratio interpolation operation, and sets the desired torque capacity of the associated friction engagement element to the inertia phase starting point optimum torque capacity TR2. While the actual transmission gear ratio is lower than the inertia phase starting point transmission gear ratio GR1, automatic transmission controller 20 repeatedly performs the flow of Steps S50, S51, S52, S53 and S54, so that the desired torque capacity is maintained equal to the inertia phase starting point optimum torque capacity TR2.

When the actual transmission gear ratio changes to be higher than or equal to the inertia phase starting point transmission gear ratio GR1, automatic transmission controller 20 proceeds in the flow chart of FIG. 5 through Steps S50 and S51 to Step S55 at which automatic transmission controller 20 determines whether or not the actual transmission gear ratio is lower than or equal to the inertia phase intermediate point transmission gear ratio GR2_REL. When the actual transmission gear ratio is lower than or equal to the inertia phase intermediate point transmission gear ratio GR2_REL, automatic transmission controller 20 proceeds from Step S55 to Step S56 at which automatic transmission controller 20 calculates the desired torque capacity by interpolation from the inertia phase starting point optimum torque capacity TR2 at the inertia phase starting point transmission gear ratio GR1 and the inertia phase intermediate point optimum torque capacity TR3 at the inertia phase intermediate point transmission gear ratio GR2_REL. While the actual transmission gear ratio is lower than or equal to the inertia phase intermediate point transmission gear ratio GR2_REL, automatic transmission controller 20 repeatedly performs the flow of Steps S50, S51, S55, S56, S53 and S54 so that the desired torque capacity is set by the transmission gear ratio interpolation operation based on the inertia phase starting point optimum torque capacity TR2 and the inertia phase intermediate point optimum torque capacity TR3.

When the actual transmission gear ratio changes to be higher than the inertia phase intermediate point transmission gear ratio GR2_REL, automatic transmission controller 20 proceeds in the flow chart of FIG. 5 through Steps S50, S51 and S55 to Step S57 at which automatic transmission controller 20 determines whether or not the actual transmission gear ratio is lower than or equal to the inertia phase end point transmission gear ratio GrEnd. When the actual transmission gear ratio is lower than or equal to the inertia phase end point transmission gear ratio GrEnd, automatic transmission controller 20 proceeds from Step S57 to Step S58 at which automatic transmission controller 20 calculates the desired torque capacity by interpolation from the inertia phase intermediate point optimum torque capacity TR3 at the inertia phase intermediate point transmission gear ratio GR2_REL and the inertia phase end point optimum torque capacity TR4 at the inertia phase end point transmission gear ratio GrEnd. While the actual transmission gear ratio is lower than or equal to the inertia phase end point transmission gear ratio GrEnd, automatic transmission controller 20 repeatedly performs the flow of Steps S50, S51, S55, S57, S58, S53 and S54 so that the desired torque capacity is set by the transmission gear ratio interpolation operation based on the inertia phase intermediate point optimum torque capacity TR3 and the inertia phase end point optimum torque capacity TR4.

When the actual transmission gear ratio changes to be higher than the inertia phase end point transmission gear ratio GrEnd, automatic transmission controller 20 proceeds in the flow chart of FIG. 5 through Steps S50, S51, S55 and S57 to Step S59 at which automatic transmission controller 20 inhibits transmission gear ratio interpolation operation, and sets the desired torque capacity to the inertia phase end point optimum torque capacity TR4. While the actual transmission gear ratio is higher than the inertia phase end point transmission gear ratio GrEnd, automatic transmission controller 20 repeatedly performs the flow of Steps S50, S51, S55, S57, S59, S53 and S54, so that the desired torque capacity is maintained equal to the inertia phase end point optimum torque capacity TR4.

According to the process of transmission gear ratio interpolation operation described above, as shown in FIG. 8, the desired torque capacity is calculated by interpolation based on two of the inertia phase starting point optimum torque capacity TR2, inertia phase intermediate point optimum torque capacity TR3, and inertia phase end point optimum torque capacity TR4, when the actual transmission gear ratio is between the inertia phase starting point transmission gear ratio GR1 and inertia phase end point transmission gear ratio GrEnd. When the actual transmission gear ratio is lower than the inertia phase starting point transmission gear ratio GR1, the desired torque capacity is set to the inertia phase starting point optimum torque capacity TR2 at the inertia phase starting point transmission gear ratio GR1. On the other hand, when the actual transmission gear ratio is higher than the inertia phase end point transmission gear ratio GrEnd, the desired torque capacity is set to the inertia phase end point optimum torque capacity TR4 at the inertia phase end point transmission gear ratio GrEnd.

<Mind Change Gear Shift Process> FIGS. 9A to 9E are time charts showing how a gear shift is performed in response to a request for a downshift to third gear during a third to fifth gear shift in the embodiment, where FIGS. 9A to 9E show the actual transmission gear ration GR, a final target gear NxtGp, an intermediate target gear SftGp, a current gear CurGp, and hydraulic pressures of the friction engagement element, respectively.

Suppose a situation as shown in FIG. 3 where the operating point moves from point A to point B in response to release of the accelerator pedal so that a request for an upshift from third gear to fifth gear is issued, and the operating point moves from point C to point D in response to depression of the accelerator pedal before the upshift is completed, so that a request for a downshift to third gear is issued.

As shown in FIGS. 9A to 9E, the releasing operation of the accelerator pedal in third gear causes a request for an upshift from third gear to fifth gear at a time instant t1. In response to this request, shift control for the upshift from third gear to fourth gear is started at time instant t1 by engagement of third clutch C3 and disengagement of second brake B2. At a time instant t2 during the shift control for the upshift from third gear to fourth gear, a pre-shift control for an upshift to fifth gear is started by engagement of first clutch C1 and disengagement of third brake B3.

At a time instant t3 before the shift control for the upshift to fifth gear is completed, the depressing operation of the accelerator pedal causes a mind change gear shift request for a downshift to third gear, the shift control for the upshift to fifth gear is aborted, and shift control for a downshift to third gear is started. At time instant t3, the actual transmission gear ratio is close to the value corresponding to fifth gear, because the pre-shift control is started during the upshift from third gear to fourth gear, as shown in FIG. 9A. Then, the actual transmission gear ratio continues to change in the upshift direction toward the value corresponding to fifth gear until a time instant t4, because of delay of response of the hydraulic pressure of the friction engagement element, although the mind change gear shift request is issued at time instant t3. When the direction of change of the actual transmission gear ratio is changed from the upshift direction to the downshift direction at time instant t4, the transmission gear ratio interpolation operation according to the embodiment is applied to the control of the hydraulic pressure of third clutch C3 which is to be disengaged for the shift to third gear, as follows.

Since the transmission gear ratio interpolation operation according to the embodiment maintains the desired torque capacity to the inertia phase starting point optimum torque capacity TR2 at the inertia phase starting point transmission gear ratio GR1 when the actual transmission gear ratio is outside of the transmission gear ratio interval between third and fourth gears, the hydraulic pressure of third clutch C3 decreases moderately as indicated by a curve Pc3" in FIG. 9E until a time instant t5 when the actual transmission gear ratio reaches the inertia phase starting point transmission gear ratio GR1 from outside of the transmission gear ratio interval. This is effective for performing the inertia phase at suitable speed, and thereby achieving a high-quality gear shift control with no unnecessary delay and no great shock.

During the period from the time instant t5 when the actual transmission gear ratio reaches the inertia phase starting point transmission gear ratio GR1 to the time instant t6 when the actual transmission gear ratio reaches the inertia phase end point transmission gear ratio GrEnd, the desired torque capacity of third clutch C3 is calculated as a suitable value by interpolation based on the changing actual transmission gear ratio. During the period from the time instant t6 when the actual transmission gear ratio reaches the inertia phase end point transmission gear ratio GrEnd to the time instant t7 when the shift control for the downshift is completed, the desired torque capacity is maintained equal to the inertia phase end point optimum torque capacity TR4. The inertia phase end point optimum torque capacity TR4 of third clutch C3 is set so that engagement of second brake B2 as a friction engagement element to be engaged does not cause any great shock after the actual transmission gear ratio reaches the value corresponding to third gear as a final target point. This prevents shocks of fluctuations of the actual transmission gear ratio and fluctuations of the vehicle longitudinal acceleration which result from change of the inputted torque according to the progress of engagement of second brake B2 after the actual transmission gear ratio reaches the value corresponding to third gear.

After time instant t7 when the process of transmission gear ratio interpolation operation is terminated, the control of the hydraulic pressure of the friction engagement elements is completed at a time instant t8 by quick reduction of the torque capacity of third clutch C3 and quick increase of the torque capacity of second brake B2 so that the downshift to third gear is completed where third clutch C3 is in the fully disengaged state and second brake B2 is in the fully engaged state.

The following describes how the automatic transmission control apparatus according to the embodiment produces advantageous effects.

<1> An automatic transmission control apparatus for an automatic transmission (13, 14, 17) in which a first friction engagement element (C3) is in a disengaged state and a second friction engagement element (B2) is in an engaged state when in a first target gear, and the first friction engagement element (C3) is in an engaged state and the second friction engagement element (B2) is in a disengaged state when in a second target gear, the automatic transmission control apparatus comprising: a sensor (3, 4, 5) for obtaining an actual transmission gear ratio (GR) of the automatic transmission (13, 14, 17); and a controller (20) connected to the sensor (3, 4, 5), and configured to: perform a first shift control of controlling a shift of the first friction engagement element (C3) from the engaged state into the disengaged state and a shift of the second friction engagement element (B2) from the disengaged state into the engaged state for a first gear shift of the automatic transmission (13, 14, 17) from the second target gear to the first target gear (see FIG. 4); and perform a process during the first shift control, the process including: a first operation (see FIG. 5) of setting a desired torque capacity (TR) of one of the first and second friction engagement elements (C3, B2) on a basis of the actual transmission gear ratio (GR) by interpolation from values (TR2, TR3, TR4) of the desired torque capacity corresponding to at least first and second reference transmission gear ratios (GR1, GR2_REL, GrEnd), wherein the first reference transmission gear ratio (GR1) is a transmission gear ratio at start of an inertia phase of the first shift control; and a second operation (see FIG. 5, Steps S50, S51, S52, S53 and S54) of setting the desired torque capacity (TR) to the value (TR2) corresponding to the first reference transmission gear ratio (GR1), in response to determination (see Step S51) that the first reference transmission gear ratio (GR1) is between the actual transmission gear ratio (GR) and the second reference transmission gear ratio (GR2_REL, GrEnd), wherein the controller (20) is further configured to inhibit the first operation in response to determination that the first reference transmission gear ratio (GR1) is between the actual transmission gear ratio (GR) and the second reference transmission gear ratio (GR2_REL, GrEnd), and wherein the controller (20) is further configured to start the process in response to determination that the actual transmission gear ratio (GR) has started to change in a direction from the second target gear toward the first target gear, is effective for achieving a smooth and speedy inertia phase of a gear shift while preventing the torque capacity of an associated friction engagement element from deviating from a desired range, and preventing the load of calculation from increasing. The first target gear and the second target gear correspond to third gear and fourth gear, respectively, in the embodiment.

<2> The automatic transmission control apparatus wherein the controller (20) is further configured to perform the process for the first friction engagement element (C3) as the one of the first and second friction engagement elements (C3, B2), in response to determination that the automatic transmission (13, 14, 17) is subject to an input torque in a direction conforming to a change of an input speed of the automatic transmission (13, 14, 17) resulting from the first gear shift, is effective for controlling a friction engagement element that plays a major role in controlling the progress of such a gear shift, so as to initiate an inertia phase of the gear shift and control the speed of progress of the gear shift as intended. The situation where the automatic transmission (13, 14, 17) is subject to an input torque in a direction conforming to a change of an input speed of the automatic transmission (13, 14, 17) resulting from the first gear shift, appears during power-on downshifts or power-off upshifts. Also, the automatic transmission control apparatus wherein the controller (20) is further configured to perform the process for the second friction engagement element (B2) as the one of the first and second friction engagement elements (C3, B2), in response to determination that the automatic transmission (13, 14, 17) is subject to an input torque in a direction opposite to a change of an input speed of the automatic transmission (13, 14, 17) resulting from the first gear shift, is effective for controlling a friction engagement element that plays a major role in controlling the progress of such a gear shift, so as to initiate an inertia phase of the gear shift and control the speed of progress of the gear shift as intended. The situation where the automatic transmission (13, 14, 17) is subject to an input torque in a direction opposite to a change of an input speed of the automatic transmission (13, 14, 17) resulting from the first gear shift appears during power-on upshifts or power-off downshifts.

<3> The automatic transmission control apparatus wherein the controller (20) is further configured to: abort a second shift control for a second gear shift of the automatic transmission (13, 14, 17), and start the first shift control, in response to a request for the first gear shift during the second shift control (See FIG. 4, Step S46 and S48); and start the process in response to determination that the actual transmission gear ratio (GR) has started to change in a direction from the second target gear toward the first target gear after the request for the first gear shift, is effective for achieving a smooth and speedy inertia phase of a gear shift while preventing the torque capacity of an associated friction engagement element from deviating from a desired range, even in cases where an actual transmission gear ratio is likely to fall outside of a transmission gear ratio interval.

<4> The automatic transmission control apparatus wherein: the second gear shift is a gear shift from a third target gear to a fourth target gear two or more steps away from the third target gear; and the controller (20) is further configured to implement the second shift control by: starting a first step of the second shift control for a shift from the third target gear to a target gear that is one step away from the third target gear toward the fourth target gear; and starting each step of the second shift control, other than the first step, for a shift from a corresponding target gear to a target gear that is one step away from the corresponding target gear toward the fourth target gear, before completing a step of the second shift control which is immediately preceding the each step, is effective for achieving a smooth and speedy inertia phase of a gear shift while preventing the torque capacity of an associated friction engagement element from deviating from a desired range, even in cases where an actual transmission gear ratio is likely to fall outside of a transmission gear ratio interval. The third target gear and the fourth target gear in this paragraph correspond to third gear and fifth gear, respectively, in the embodiment.

<5> The automatic transmission control apparatus wherein the controller (20) is further configured to: implement a second shift control for an upshift of the automatic transmission (13, 14, 17) from the first target gear to a third target gear two steps higher than the first target gear, in response to a request for the upshift, by: starting a first step of the second shift control for a shift from the first target gear to the second target gear as a gear between the first and third target gears; and starting a second step of the second shift control for a shift from the second target gear to the third target gear, before completing the first step; abort the second shift control, and start the first shift control, in response to a request for the first gear shift during the second shift control; and start the process for the first friction engagement element (C3) as the one of the first and second friction engagement elements (C3, B2), in response to determination that the actual transmission gear ratio (GR) has started to change in a direction from the second target gear toward the first target gear after the request for the first gear shift, is effective for achieving a smooth and speedy inertia phase of a gear shift while preventing the torque capacity of an associated friction engagement element from deviating from a desired range, in a case of power-on downshift where an actual transmission gear ratio is likely to fall outside of a transmission gear ratio interval. The third target gear in this paragraph corresponds to fifth gear in the embodiment.

The embodiment described above may be modified as follows. The transmission gear ratio interpolation operation according to the embodiment is applied to control of the torque capacity of a friction engagement element to be disengaged during a power-on downshift (downshift under driving), but may be applied to control of the torque capacity of a friction engagement element to be disengaged during a power-off upshift (upshift under coasting), or control of the torque capacity of a friction engagement element to be engaged during a power-off downshift (downshift under coasting), or control of the torque capacity of a friction engagement element to be engaged during a power-on upshift (upshift under driving).

In the embodiment, the transmission gear ratio interpolation operation is applied to a mind change gear shift process in which the actual transmission gear ratio is likely to fall outside of a transmission gear ratio interval between two related adjacent transmission gear ratios. However, the transmission gear ratio interpolation operation may be applied to a normal upshift or downshift between two adjacent transmission gear ratios in which due to disturbance or variation in parts or degradation with time, the actual transmission gear ratio deviates from the transmission gear ratio interval at start of a gear shift, and then starts to change in a direction conforming to the gear shift.

Although the embodiment employs the seven forward speed and one reverse speed automatic transmission, the automatic transmission control apparatus may be applied to other automatic transmissions provided with a plurality of forward gears.

The entire contents of Japanese Patent Application 2008-160705 filed Jun. 19, 2008 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission control apparatus for an automatic transmission in which a first friction engagement element is in a disengaged state and a second friction engagement element is in an engaged state when in a first target gear, and the first friction engagement element is in an engaged state and the second friction engagement element is in a disengaged state when in a second target gear, the automatic transmission control apparatus comprising:

a sensor for obtaining an actual transmission gear ratio of the automatic transmission; and
a controller connected to the sensor, and configured to:
perform a first shift control of controlling a shift of the first friction engagement element from the engaged state into the disengaged state and a shift of the second friction engagement element from the disengaged state into the engaged state for a first gear shift of the automatic transmission from the second target gear to the first target gear; and
perform a process during the first shift control, the process including:
a first operation of setting a desired torque capacity of one of the first and second friction engagement elements on a basis of the actual transmission gear ratio by interpolation from values of the desired torque capacity corresponding to at least first and second reference transmission gear ratios, wherein the first reference transmission gear ratio is a transmission gear ratio at start of an inertia phase of the first shift control; and
a second operation of setting the desired torque capacity to the value corresponding to the first reference transmission gear ratio, in response to determination that the first reference transmission gear ratio is between the actual transmission gear ratio and the second reference transmission gear ratio.

2. The automatic transmission control apparatus as claimed in claim 1, wherein the controller is further configured to inhibit the first operation in response to determination that the first reference transmission gear ratio is between the actual transmission gear ratio and the second reference transmission gear ratio.

3. The automatic transmission control apparatus as claimed in claim 1, wherein the controller is further configured to start the process in response to determination that the actual transmission gear ratio has started to change in a direction from the second target gear toward the first target gear.

4. The automatic transmission control apparatus as claimed in claim 1, wherein the controller is further configured to perform the process for the first friction engagement element as the one of the first and second friction engagement elements, in response to determination that the automatic transmission is subject to an input torque in a direction conforming to a change of an input speed of the automatic transmission resulting from the first gear shift.

5. The automatic transmission control apparatus as claimed in claim 1, wherein the controller is further configured to perform the process for the second friction engagement element as the one of the first and second friction engagement elements, in response to determination that the automatic transmission is subject to an input torque in a direction opposite to a change of an input speed of the automatic transmission resulting from the first gear shift.

6. The automatic transmission control apparatus as claimed in claim 1, wherein the controller is further configured to:
abort a second shift control for a second gear shift of the automatic transmission, and start the first shift control, in response to a request for the first gear shift during the second shift control; and
start the process in response to determination that the actual transmission gear ratio has started to change in a direction from the second target gear toward the first target gear after the request for the first gear shift.

7. The automatic transmission control apparatus as claimed in claim 6, wherein:
the second gear shift is a gear shift from a third target gear to a fourth target gear two or more steps away from the third target gear; and
the controller is further configured to implement the second shift control by:
starting a first step of the second shift control for a shift from the third target gear to a target gear that is one step away from the third target gear toward the fourth target gear; and
starting each step of the second shift control, other than the first step, for a shift from a corresponding target gear to a target gear that is one step away from the corresponding target gear toward the fourth target gear, before completing a step of the second shift control which is immediately preceding the each step.

8. The automatic transmission control apparatus as claimed in claim 1, wherein the controller is further configured to:
implement a second shift control for an upshift of the automatic transmission from the first target gear to a third target gear two steps higher than the first target gear, in response to a request for the upshift, by:
starting a first step of the second shift control for a shift from the first target gear to the second target gear as a gear between the first and third target gears; and
starting a second step of the second shift control for a shift from the second target gear to the third target gear, before completing the first step;
abort the second shift control, and start the first shift control, in response to a request for the first gear shift during the second shift control; and
start the process for the first friction engagement element as the one of the first and second friction engagement elements, in response to determination that the actual transmission gear ratio has started to change in a direction from the second target gear toward the first target gear after the request for the first gear shift.

9. An automatic transmission control apparatus for an automatic transmission in which a first friction engagement element is in a disengaged state and a second friction engagement element is in an engaged state when in a first target gear, and the first friction engagement element is in an engaged state and the second friction engagement element is in a disengaged state when in a second target gear, the automatic transmission control apparatus comprising:
means for obtaining an actual transmission gear ratio of the automatic transmission;
means for performing a first shift control of controlling a shift of the first friction engagement element from the engaged state into the disengaged state and a shift of the second friction engagement element from the disengaged state into the engaged state for a first gear shift of the automatic transmission from the second target gear to the first target gear; and
means for performing a process during the first shift control, the process including:
a first operation of setting a desired torque capacity of one of the first and second friction engagement elements on a basis of the actual transmission gear ratio by interpolation from values of the desired torque capacity corresponding to at least first and second reference transmission gear ratios, wherein the first reference transmission gear ratio is a transmission gear ratio at start of an inertia phase of the first shift control; and a second operation of setting the desired torque capacity to the value corresponding to the first reference transmission gear ratio, in response to determination that the first reference transmission gear ratio is between the actual transmission gear ratio and the second reference transmission gear ratio.

10. An automatic transmission control method for an automatic transmission in which a first friction engagement element is in a disengaged state and a second friction engagement element is in an engaged state when in a first target gear, and the first friction engagement element is in an engaged state and the second friction engagement element is in a disengaged state when in a second target gear, the automatic transmission control method comprising:

obtaining an actual transmission gear ratio of the automatic transmission;

performing a first shift control of controlling a shift of the first friction engagement element from the engaged state into the disengaged state and a shift of the second friction engagement element from the disengaged state into the engaged state for a first gear shift of the automatic transmission from the second target gear to the first target gear; and performing a process during the first shift control, the process including:

a first operation of setting a desired torque capacity of one of the first and second friction engagement elements on a basis of the actual transmission gear ratio by interpolation from values of the desired torque capacity corresponding to at least first and second reference transmission gear ratios, wherein the first reference transmission gear ratio is a transmission gear ratio at start of an inertia phase of the first shift control; and a second operation of setting the desired torque capacity to the value corresponding to the first reference transmission gear ratio, in response to determination that the first reference transmission gear ratio is between the actual transmission gear ratio and the second reference transmission gear ratio.

* * * * *